United States Patent Office 3,231,624
Patented Jan. 25, 1966

3,231,624
PROCESS FOR PREPARING TETRAFLUORO- AND PENTAFLUOROBENZENES
James W. Dale, Winchester, and Gerald J. O'Neill, Boston, Mass., assignors to Monsanto Research Corporation, St. Louis, Mo., a corporation of Delaware
No Drawing. Filed Aug. 10, 1962, Ser. No. 216,054
4 Claims. (Cl. 260—650)

This invention relates to a process for manufacturing polyfluorobenzenes. More particularly the invention relates to a process for preparing tetrafluoro- and pentafluorobenzenes.

Tetra- and pentafluorobenzenes are important intermediates for the preparation of fluroine containing polymers and other fluorine containing aromatic compounds such as the polyfluorophenylethers. Unfortunately methods for making the tetra- and pentafluorobenzene have hitherto been cumbersome and impractical.

In general prior processes have involved fluorination of benzene or benzene derivatives with cobalt trifluoride to produce a mixture of fluorinated cyclohexyl compounds, separation of the mixture into individual components, defluorination of one or more individual components to hexafluorobenzene and finally hydrogenative defluorination of hexafluorobenzene under critical conditions to the desired compounds. In some cases it has been found possible to defluorinate one or more of the individual components of the original reaction directly to pentafluorobenzene providing extensive fractionation of the original mixture was performed to obtain the individual components in a substantially pure form.

It is an object of this invention to provide a process for defluorination of polyfluorocyclohexene compounds directly to tetra- and pentafluorobenzene.

A further object is to provide a process for defluorination of a mixture of polyfluorocyclohexene compounds directly to tetra- and pentafluorobenzene.

These and other objects are attained by carrying out the defluorination reaction in the presence of small and controlled amounts of water with or without moderate additions of hydrogen fluoride or hydrogen or both.

The following examples are given in illustration and not in limitation of the scope of this invention. Where parts are mentioned they are parts by weight.

Example 1

Prepare a mixture of fluorinated cyclohexanoyl fluorides by electrofluorination of benzoyl fluoride $$-C_6H_5COF-$$

using standard conditions in a Simons cell. The cell product, containing 70–80% acid fluorides, is hydrolysed to a mixture of the corresponding acids in almost quantitative yields. The acid mixture is then pyrolysed in a carbon tube at about 550° C. yielding a mixture consisting of about 70% by weight of decafluorocyclohexene with the remaining 30% being made up of polyfluorohydrocyclohexenes and unidentified materials.

Place 100 parts of the mixture obtained above in a rotatable cylinder together with 2 parts of water and 4000 parts of powdered iron. Heat the cylinder to about 450° C. with constant rotation to effect stirring. After about 1–3 hours, cool the cylinder to recover the volatile contents. The major portion is a mixture of pentafluorobenzene and tetrafluorobenzene with generally lesser amounts of hexafluorobenzene making for an overall yield of about 80%. This mixture can be partially separated by fractionation and further separated by a preparative vapor phase chromatography, or can be used directly to prepare derivatives such as pentafluorobromobenzene and tetrafluorodibromobenzene which are easily separated by fractionation. Throughout the reaction keep a slight positive pressure of dry nitrogen in the cylinder.

If the water used contains moderate amounts of hydrogen fluoride (up to 48% by weight based on the water) similar results are obtained but a greater portion of the starting material is converted to the desired polyfluorobenzenes.

A limiting factor of the reaction shown in the example is the poisoning of the catalyst by the formation of iron fluorides. This necessitates a large amount of catalyst to carry the reaction to completion. To avoid catalyst poisoning and the necessity for using large amounts of catalyst a tubular reactor can be used and a continuous but small stream of hydrogen is added throughout the reaction. As a result catalyst poisoning is minimized and the amount of catalyst is drastically reduced.

In place of the powdered iron catalyst set forth in the examples, nickel, cobalt or copper may be used. For most efficient operation the catalyst should be in powder form except where an open end reactor such as a tubular reactor is used accompanied by a constant flow of hydrogen. In the latter case, the catalyst can be in the form of metal gauze to present a large surface area and to allow for uniform flow through the reactor.

The amount of the water must be carefully controlled within the range 1–5% by weight based on the weight of the fluorocyclohexyl starting material. Below 1% reaction is not extensive and above 5% recovery is poor and products are largely gaseous fluorocarbons.

If desired, the water may contain up to 50% by weight of hydrogen fluoride as an agent in directing the course of the reaction.

To provide a more efficient reaction, it is desirable to add hydrogen to the reaction medium. This may be done in a cylinder type reactor by adding hydrogen at the beginning, intermittently throughout or continuously throughout the reaction. If a continuous reactor is used, it is preferable to add the hydrogen continuously.

The amount of hydrogen should not exceed (on a molar basis) the number of moles of fluorine to be removed from the starting polyfluorocyclohexenes.

The temperature of the reaction may preferably vary between 425–475° C. depending to some extent on the nature of the starting materials.

Oxygen should be excluded from the reaction vessel. This is best accomplished by sweeping out the vessel with dry nitrogen prior to loading the reactants and keeping a slight positive pressure of dry nitrogen in the reaction vessel throughout the reaction. It is necessary to use dry nitrogen to prevent the inclusion of undesirable amounts of water.

The compounds which can be defluorinated by the process of this invention are polyfluorocyclohexenes, $C_6H_xF_{10}$, where $x=0$, 1 and 2, that is, polyfluorocyclohexenes containing from 8 to 10 fluorine atoms. They are conveniently prepared by the pyrolysis of the polyfluorocyclohexanoic acids resulting from hydrolysis of the corresponding acyl fluorides obtained by the electrofluorination of benzoyl fluoride in a Simons cell. The pyrolysis proceeds as

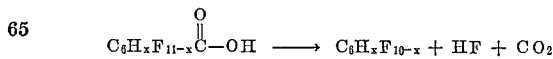

The process of this invention makes initial separation of the above cyclohexene mixture unnecessary when the desired end products are penta-, and tetra-fluorobenzenes or derivatives of these such as the mono- and di-bromo compounds referred to above.

What is claimed is:

1. A process for preparing pentafluorobenzene, tetrafluorobenzene and mixtures thereof which consists in heating a mixture of polyfluorocyclohexenes containing from 8 to 10 fluorine atoms, about 70% of said mixture being decafluorocyclohexene, at a temperature of 425–475° C. in contact with a metal catalyst taken from the group consisting of iron, nickel, cobalt, and copper, in admixture with from 1 to 5% by weight of water based on the weight of the polyfluorocyclohexenes, said process being carried out in a atmosphere inert to the reaction.

2. A process for preparing pentafluorobenzene, tetrafluorobenzene and mixtures thereof which consists in heating a mixture of polyfluorocyclohexenes containing from 8 to 10 fluorine atoms, about 70% of said mixture being decafluorocyclohexene, at a temperature of 425–475° C. in contact with iron, in admixture with from 1 to 5% by weight of water based on the weight of the polyfluorocyclohexenes, said process being carried out in an atmosphere inert to the reaction.

3. A process for preparing pentafluorobenzene, tetrafluorobenzene and mixtures thereof which consists in heating a mixture of polyfluorocyclohexenes containing 8 to 10 fluorine atoms, about 70% of said mixture being decafluorocyclohexene, at a temperature of 425–475° C. in contact with a metal catalyst taken from the group consisting of iron, nickel, cobalt, and copper in admixture with from 1 to 5% by weight of water based on the weight of the polyfluorocyclohexenes, said water containing hydrogen fluoride, said process being carried out in an atmosphere inert to the reaction.

4. A process for preparing pentafluorobenzene, tetrafluorobenzene and mixtures thereof which consists in heating a mixture of polyfluorocyclohexenes containing from 8 to 10 fluorine atoms, about 70% of said mixture being decafluorocyclohexene, at a temperature of 425–475° C. in contact with a metal catalyst taken from the group consisting of iron, nickel, cobalt, and copper, in admixture with from 1 to 5% by weight of water based on the weight of the polyfluorocyclohexenes, in an atmosphere inert to the reaction, while adding hydrogen continuously throughout the process.

References Cited by the Examiner

UNITED STATES PATENTS

| | | | |
|---|---|---|---|
| 2,886,605 | 5/1959 | McClure et al. | 260—650 |
| 3,000,976 | 9/1961 | Patrick et al. | 260—650 |

LEON ZITVER, *Primary Examiner.*

HAROLD G. MOORE, JOSEPH R. LIBERMAN,
*Examiners.*

It is obvious that variations may be made in the processes of this invention without departing from the spirit and scope thereof as defined by the appended claims.